(12) United States Patent
Fletcher et al.

(10) Patent No.: US 7,484,681 B2
(45) Date of Patent: Feb. 3, 2009

(54) CARTRIDGE BUCKLE REINFORCEMENT AND DAMAGE INDICATOR

(75) Inventors: Kevin S. Fletcher, Boulder, CO (US); Michael George Krasilinec, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 350 days.

(21) Appl. No.: 11/336,254

(22) Filed: Jan. 20, 2006

(65) Prior Publication Data

US 2007/0170294 A1 Jul. 26, 2007

(51) Int. Cl.
G11B 15/66 (2006.01)

(52) U.S. Cl. .................................... 242/332.4

(58) Field of Classification Search .............. 242/332.4, 242/348, 348.2, 580, 532.6; 360/132
See application file for complete search history.

(56) References Cited

U.S. PATENT DOCUMENTS

| | | | |
|---|---|---|---|
| 5,371,638 A | 12/1994 | Saliba | |
| 5,610,789 A * | 3/1997 | Miller | 360/132 |
| 5,971,310 A | 10/1999 | Saliba et al. | |
| 6,175,470 B1 | 1/2001 | Stamm | |
| 6,271,991 B1 | 8/2001 | Saliba et al. | |
| 6,311,915 B1 | 11/2001 | Rathweg | |
| 6,490,133 B1 * | 12/2002 | Okamura et al. | 360/132 |
| 6,550,710 B2 | 4/2003 | Hoge et al. | |
| 6,581,865 B1 | 6/2003 | Zweighaft et al. | |
| 6,588,694 B1 | 7/2003 | Wilkerson | |
| 6,902,128 B2 | 6/2005 | Kuhar | |
| 6,971,602 B1 * | 12/2005 | Morgan et al. | 242/332.4 |
| 7,016,151 B2 * | 3/2006 | Hoge et al. | 360/132 |
| 2002/0017581 A1 * | 2/2002 | Sogabe et al. | 242/332.4 |
| 2005/0161544 A1 * | 7/2005 | Inugai et al. | 242/332.4 |

* cited by examiner

*Primary Examiner*—William A Rivera
(74) *Attorney, Agent, or Firm*—Morrison & Foerster LLP

(57) ABSTRACT

A data storage cartridge that uses a tape buckling mechanism to connect a reel of tape to a tape drive is enhanced with a buckle reinforcement feature on the cartridge door. The reinforcement feature fits between two buckle clips of the buckling mechanism, and provides reinforcing support to the buckle clips. The reinforcement feature supports the clips and thereby prevents bending and misalignment of the clips. If the clips do become bent or misaligned, the reinforcement feature prevents the door from closing completely. A user will clearly see that damage has occurred, and the user will be less likely to damage the drive by attempting to use the cartridge. Furthermore, the reinforcement feature can be wedge-shaped, so that the user may straighten the bent clips by applying additional force to the door.

32 Claims, 13 Drawing Sheets

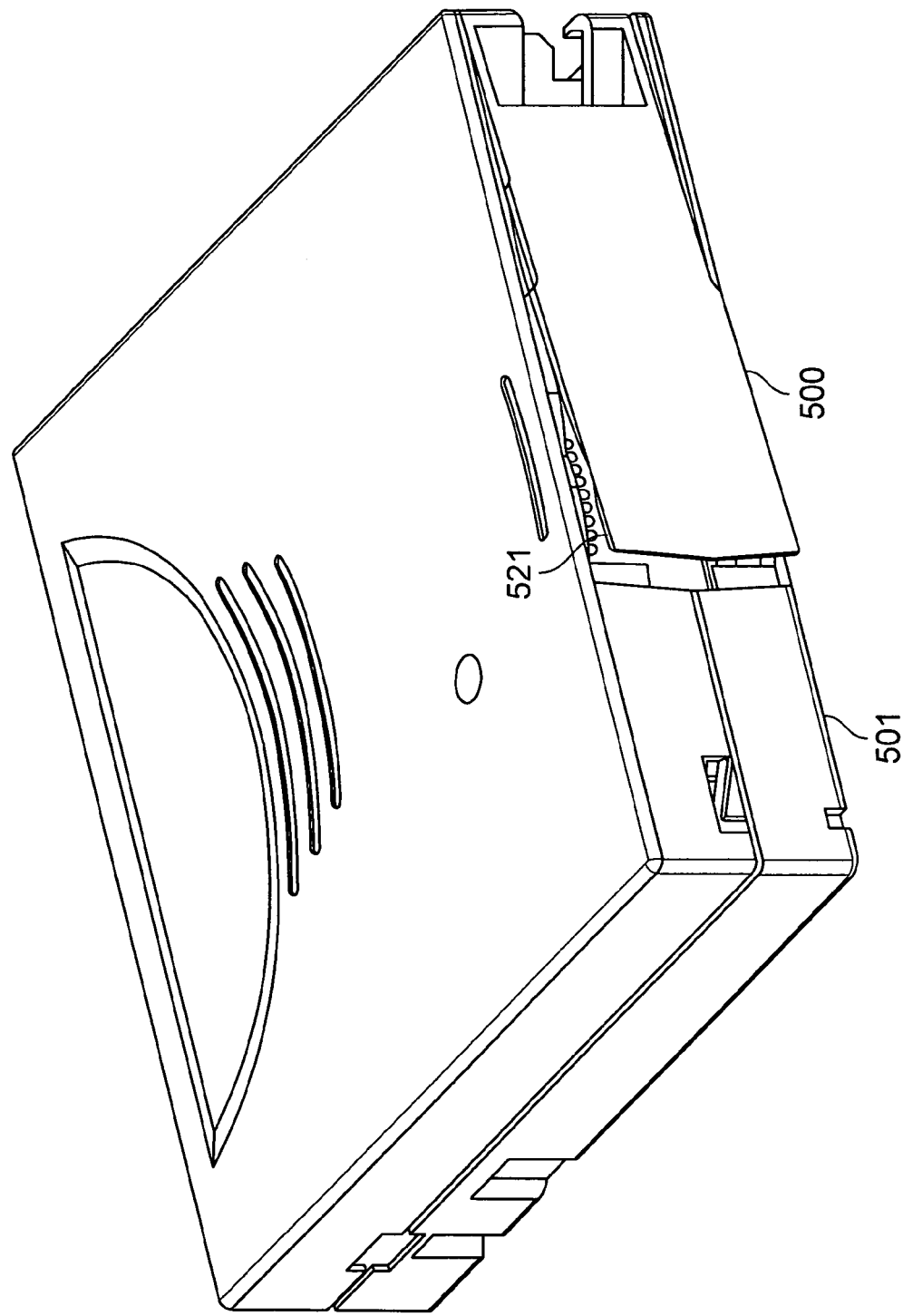

CARTRIDGE BUCKLE REINFORCEMENT AND DAMAGE INDICATOR

BACKGROUND OF THE INVENTION

1. Field of the Invention

The invention relates generally to removable data storage tape cartridges for use in tape drives, and in one aspect to a damage-resistant tape cartridge.

2. Description of the Related Art

Magnetic tape cartridges are commonly used to store digital information. Some tape cartridges contain a single reel around which is wound a thin magnetic tape. Data can be read from and written to the tape by a tape drive that contains a take-up reel. When the tape cartridge is inserted into the tape drive for reading or writing, an end portion of the tape, referred to herein as a leader, is buckled or coupled to the take-up reel so that rotation of the take-up reel results in movement of the tape from the cartridge reel past a data transducer. The leader is buckled to the tape drive reel by a buckle mechanism, which may include a buckle pin and two buckle clips. Each buckle clip is in contact with or attached to one end of the buckle pin. The pin and clips are precisely positioned and shaped to perform the buckling operation. If the buckle pin or clips are moved or deformed by more than a certain tolerable distance, for example, as a result of a tape cartridge being dropped on a floor, then the buckle mechanism will not function properly, which may result in damage to the tape or tape drive. Experiments have shown that existing tape cartridges are susceptible to deformation of buckle clips when the cartridges are dropped from a height of approximately three feet. Since the buckle clips and buckle pin are located inside the tape cartridge, a user or operator generally will not see the deformation, and will insert the damaged cartridge into the tape drive, unaware of the potential for further damage to the tape or drive.

Inserting a cartridge with bent clips or a bent pin into the tape drive can result in failures such as a swallowed leader, or the tape cartridge being physically lodged into a tape drive. Such failures may render both the cartridge 101 and the drive unusable, and may result in costly repairs and loss of data.

Even if a user does see the deformation, the user may not recognize its significance, and may still insert the damaged cartridge into the drive. It would therefore be desirable to improve the ability of the buckle clips and pin to withstand external forces and impacts without deformation. It would also be desirable to inform the user of deformation that does occur.

SUMMARY OF THE INVENTION

In general, in a first aspect, the invention features a storage medium cartridge door for use with a cartridge, the cartridge being associated with a buckle having two laterally spaced apart buckle clips, the cartridge door including a feature configured to be positioned between the buckle clips when the door is in a closed position. Embodiments of the invention may include one or more of the following features. The feature may support the clips. The feature may support a substantial portion of the surface area of a surface of each buckle clip. The feature may be separated from each buckle clip by less than a predefined distance when the door is in a closed position. The predefined distance may be 0.3 inches, 0.1 inches, 0.05 inches. The predefined distance may be a bending tolerance associated with each buckle clip, and the bending tolerance may be 0.087 inches.

The feature may include a first rib having a first rib surface positioned to be adjacent to a first buckle clip, and a second rib having a second rib surface positioned to be adjacent to a second buckle clip when the door is in a closed position. The first rib may be separated from the first buckle clip by less than a first predetermined distance, and the second rib may be separated from the second buckle clip by less than a second predetermined distance, when the door is in a closed position. The first predetermined distance may be 0.3 inches, or 0.1 inches, or 0.05 inches. The second predetermined distances may be 0.3 inches, or 0.1 inches, or 0.05 inches.

The feature may include a first rib adapted to support a first buckle clip, and a second rib adapted to support a second buckle clip when the door is in a closed position. The first rib may be positioned to support at least a center portion of the first buckle clip, and the second rib may be positioned to support at least a center portion of the second buckle clip when the door is in a closed position. The feature may be positioned on the cartridge door to contact at least a portion of a misaligned buckle clip when the door is moved from an open position toward the closed position if at least one of the buckle clips is misaligned. The feature may be positioned on the cartridge to block the door from being closed if at least one of the buckle clips is misaligned, and further positioned to allow the door to be closed if the buckle clips are properly aligned. The feature may include at least one wedged surface positioned to realign a misaligned buckle clip when the door is moved from an open position toward a closed position. The door may be pivotally connected to the cartridge. The feature may be integrally formed on the door. The feature may include a protrusion rigidly secured to the door. The clips may be separated by less than a predetermined distance, and the predetermined distance may be 0.5 inches. The feature may be positioned within less than a predetermined distance of the buckle clips when the door is in a closed position. The predetermined distance may be 0.3 inches, or 0.1 inches, or 0.05 inches. A first surface of the feature may be positioned to be separated from a first buckle clip by a first predetermined distance, and a second surface of the feature may be positioned to be separated from a second buckle clip by a second predetermined distance when the door is in a closed position. The first predetermined distance may be 0.3, 0.1, or 0.05 inches, and the second predetermined distance may be 0.3, 0.1, or 0.05 inches.

In general, in a second aspect, the invention features a storage medium cartridge door for use with a tape cartridge, the tape cartridge having at least one buckle clip, where the door includes a feature operable to be positioned adjacent to the at least one buckle clip when the door is in a closed position. In general, in a third aspect, the invention features a tape cartridge including a buckle for buckling a tape, and a cartridge door including a feature operable to support the buckle when the door is closed. The buckle may include two laterally spaced apart buckle clips, and the feature may be positioned to be adjacent to the buckle clips when the door is in a closed position. The feature may be positioned to support the two buckle clips when the door is in a closed position.

BRIEF DESCRIPTION

FIG. 5 is an illustrative drawing of a tape cartridge with a partially-closed door according to one embodiment of the invention.

DETAILED DESCRIPTION

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

A detailed description of the various components of the tape drive is provided in co-assigned U.S. Pat. No. 5,371,638, issued to Saliba. The contents of U.S. Pat. No. 5,371,638 are incorporated herein by reference. A buckle mechanism attaches a storage medium such as a magnetic tape to a tape drive, as described in co-assigned U.S. Pat. No. 6,311,915, issued to Rathweg. The contents of U.S. Pat. No 6,311,915 are incorporated herein by reference.

Figure 1:
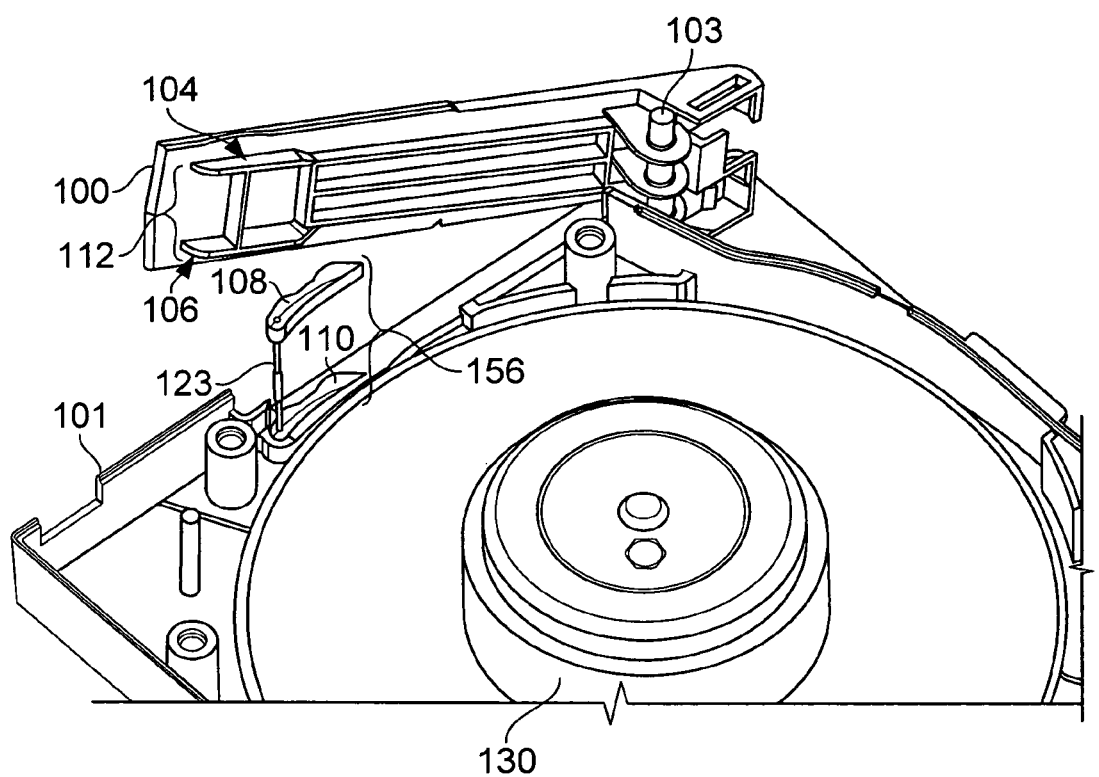
FIG. 1 is an illustrative drawing of a tape cartridge having a buckle assembly and a cartridge door in an open position according to one embodiment of the invention.
Figure 2:
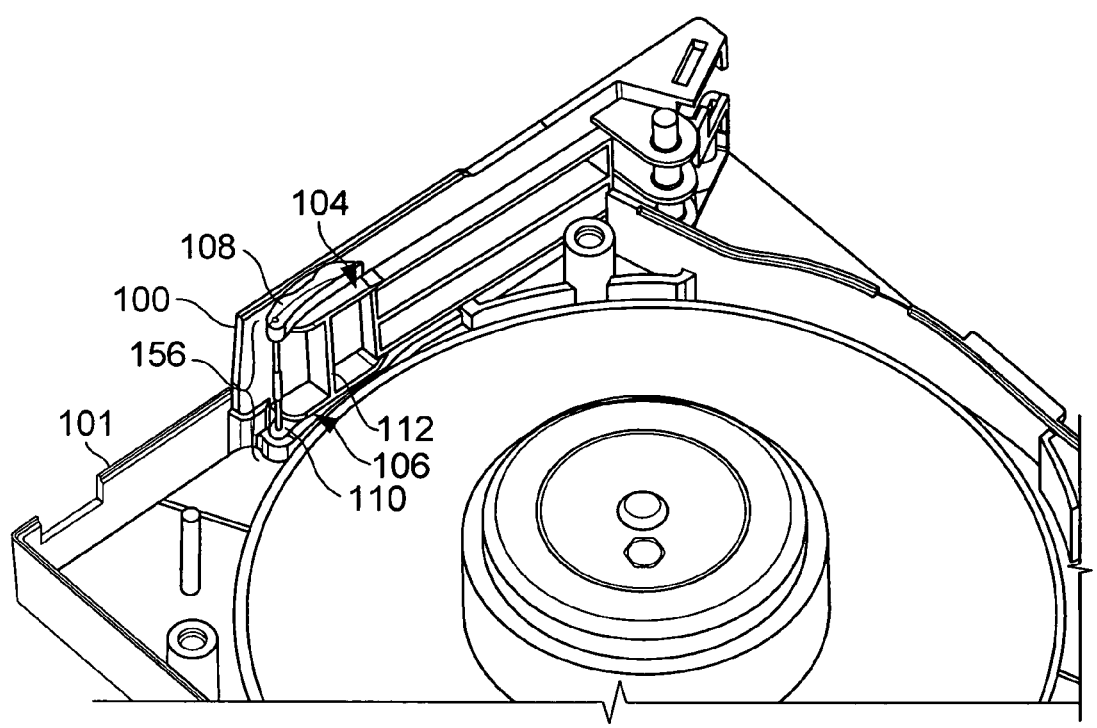
FIG. 2 is an illustrative drawing of a tape cartridge having a buckle assembly and a cartridge door in a closed position according to one embodiment of the invention.

FIG. 1 is an illustrative drawing of a magnetic tape cartridge 101 having a buckle 156 and a cartridge door 100 in an open position according to embodiments of the invention. FIG. 2 is an illustrative drawing of the magnetic tape cartridge 101 with the cartridge door 100 in a closed position according to embodiments of the invention. The cartridge door 100 is pivotally attached to the tape cartridge 101. The door 100 pivots around a spindle 103. The door 100 pivots between the open position shown in FIG. 1 and the closed position shown in FIG. 2. The door 100 has a buckle reinforcement feature 112 extending outward from the inner side of the door toward the buckle 156. The reinforcement feature 112 may be, for example, one or more ribs integrally formed on or attached to the door 100. The buckle 156 detachably connects a tape (not shown) wrapped around a reel 130 in the tape cartridge 101 to a tape drive (not shown) when the cartridge 101 is loaded into the tape drive. The buckle 156 includes a proximal buckle clip 108 and a distal buckle clip 110, which are laterally spaced apart and joined together by a buckle pin 123. The buckle 156 bends elastically (i.e., temporarily) when connecting the tape to the tape drive. However, the buckle 156 may become excessively bent to such an extent that it does not return to its original shape, e.g., as a result of an excessive force or dropping of the tape cartridge 101. An excessively bent buckle 156 will likely cause the buckle operation to fail, thereby rendering the tape cartridge 101 unusable until the buckle 156 is repaired. Without the buckle reinforcement feature 112, the buckle 156 is susceptible to bending when the door 100 is in either the open or the closed position.

In one aspect, when the cartridge 101 is not in the tape drive, the door 100 is normally in a closed position. If the cartridge 101 is subjected to an external force while it is not in the drive, e.g., from being dropped on the floor, then the reinforcement feature 112 will be adjacent to the buckle clips 108, 110 because the door 100 is closed, and the feature 112 will reinforce the buckle clips 108, 110. More specifically, in one aspect, the buckle reinforcement feature 112 includes raised ribs which are positioned to reinforce the buckle component 156 when the door 100 is in the closed position. The raised ribs include a proximal rib surface 104 and a distal rib surface 106. The proximal rib surface 104 is positioned on the door 100 to support, i.e., reinforce a proximal buckle clip 108 when the door 100 is in the closed position, or in a substantially closed position in which a portion of the proximal rib is adjacent to a portion of the proximal buckle clip 108. The distal rib surface 106 is similarly positioned to support, i.e., reinforce the distal buckle clip 110 when the door 100 is in the closed position, or in a substantially closed position. The ribs provide support for the clips by being sufficiently adjacent to the clips The buckle reinforcement feature 112 may alternatively be a single raised area which can reinforce both the proximal buckle clip 108 and the distal buckle clip 110. As another alternative, the buckle reinforcement feature 112 may include a single rib surface, e.g., the proximal rib surface 104

In one aspect, the proximal rib surface 104 may be smaller or shorter in the horizontal direction than the proximal buckle clip 108, in which case the proximal rib surface 104 should be positioned near the center of the proximal buckle clip 108, since the proximal buckle clip 108 is likely to bend near the center in some examples. The proximal rib surface 104 would then be adjacent to the center of the proximal buckle clip 108 when the door 100 is in a closed position. Similarly, the distal rib surface 106 may be positioned near the center of the distal buckle clip 110. The distal rib surface 106 would then be adjacent to the center of the distal buckle clip 110 when the door 100 is closed. Alternatively, the proximal rib surface 104 may be positioned near the right or left side of the proximal buckle clip 108, as such a position may provide sufficient support in some examples. Similarly, the distal rib surface 106 may be positioned near the right or left side of the distal buckle clip 110 in some examples. As another alternative, the proximal rib surface 104 may overlap a substantial portion, e.g., one-half, of a surface of the proximal buckle clip 108.

The term "adjacent" is used herein to indicate that two objects, e.g., the proximal buckle clip 108 and the buckle reinforcement feature 112, are located near each other and separated by a relatively small distance. The bending tolerance is sometimes referred to herein as a distance T1. In one example, the proximal buckle clip 108 and the proximal rib surface 104 would be considered adjacent if they were separated by a distance less than the bending tolerance of the proximal clip 108. In one example, the proximal buckle clip 108 with a bending tolerance of 0.14 inches would be adjacent to the proximal rib surface 104 if the proximal rib surface 104 and the clip 108 were separated by 0.14 inches or less. In one example, the proximal clip 108 and the proximal rib surface 104 would be considered adjacent if they were separated by 0.3 inches or less. In another example, the buckle clip and the rib would be adjacent if they were separated by 0.2 inches or less. In yet another example, the buckle clip and the rib would be adjacent if they were separated by 0.1 inches or less.

When the cartridge 101 is in a tape drive, the door 100 is in the open position, and the tape is able to pass through an aperture in the cartridge 101 and into the tape drive. Herein, the closed position refers to a position of the door 100 in which the door is adjacent or substantially adjacent to the cartridge 101. A small distance may separate the door 100 and the cartridge 101 in the closed position. In the closed position, the aperture is substantially covered by the door 100. In the open position, a portion of the door 100 is positioned some distance from the cartridge 101, i.e., pivoted away from the cartridge 101, and the aperture is not covered by the door 100. There is a possibility of the buckle 156 bending when the door 100 is in the open position, because the reinforcement feature 112 is not adjacent to the buckle 156 in the open position.

The buckle reinforcement feature 112 prevents the buckle 156 from excessive bending by physically supporting, i.e., reinforcing, the buckle 156 when the door 100 is in the closed position. The buckle reinforcement feature 112 is positioned on the door 100 and sized so that it will be positioned within, i.e., between, the buckle clips 108, 110 when the door 100 is in the closed position. More specifically, when the door 100 is in the closed position, the buckle reinforcement feature 112 will be positioned adjacent to the buckle clips 108, 110 so that it will contact the clips and thereby physically support the clips. In one aspect, the reinforcement feature 112 is sized so that when the feature 112 is positioned adjacent to the buckle clips 108, 110, the feature 112 supports a substantial portion, e.g., more than 50% of the surface area of a side, of each buckle clip 108, 110. With the buckle reinforcement feature 112, the buckle 156 is significantly less susceptible to bending when the door 100 is in a closed or substantially closed position.

If the buckle component 156 does become bent, and the door 100 is open or subsequently opened, the reinforcement feature 112 provides a clear indication that the buckle 156 is bent. In one aspect, the reinforcement feature 112 obstructs the door 100 when the door attempts to close automatically (e.g., via a spring), thereby preventing the door 100 from closing fully. In one aspect, the reinforcement feature 112 will physically contact the buckle component 156 and impede the movement of the door 100 when the door pivots from the open position toward the closed position, thereby clearly indicating to a user or operator that the cartridge 101 is damaged and should not be used in a tape drive until the bent buckle is repaired.

Figure 3A:
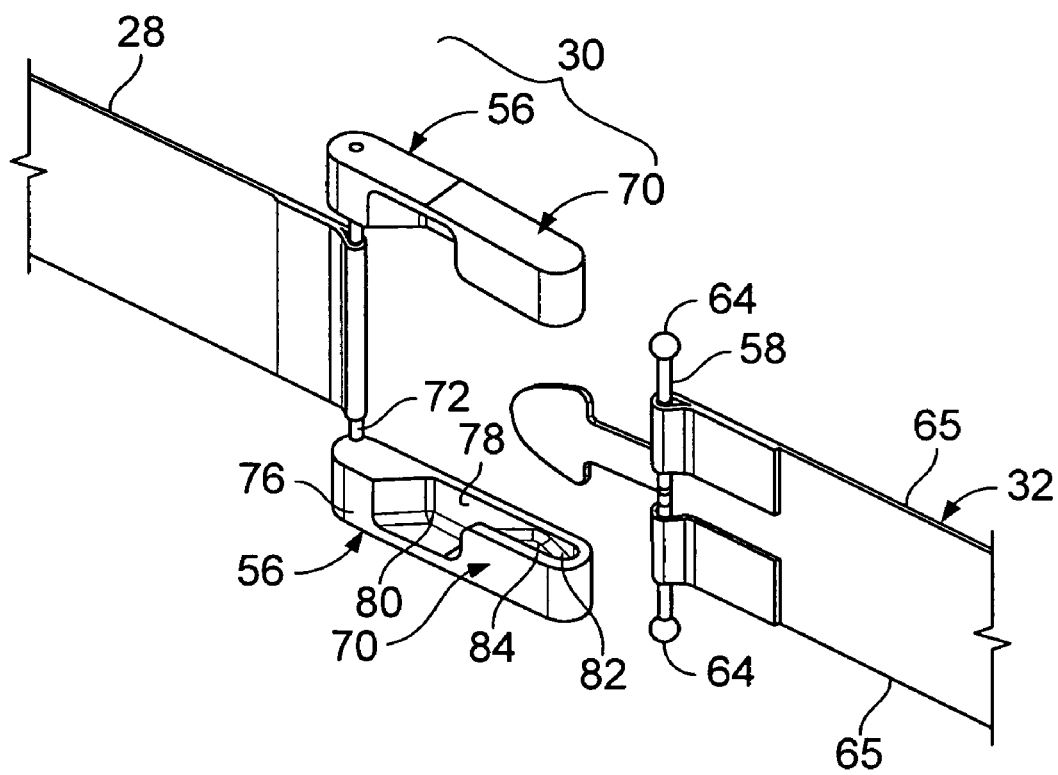
FIGS. 3A-3C are illustrative drawings of a prior art buckle during different stages of coupling.
Figure 3B:
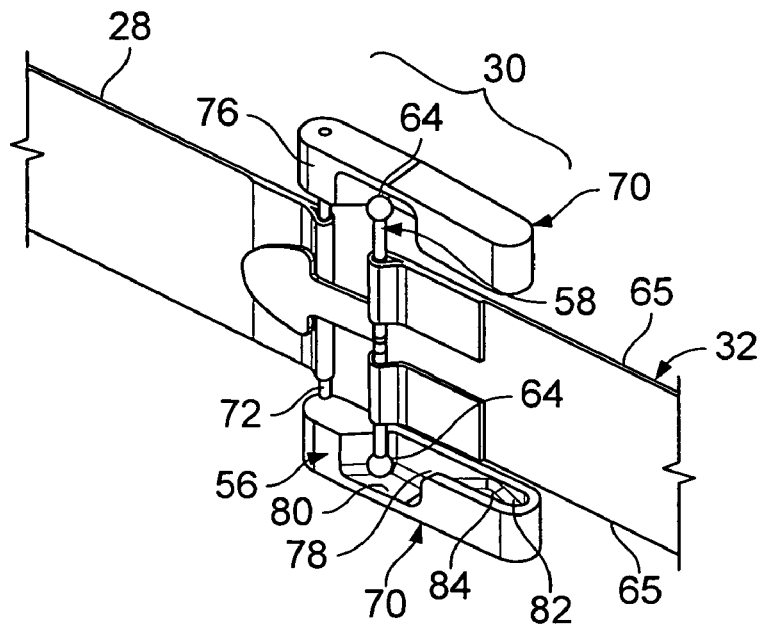
Figure 3C:
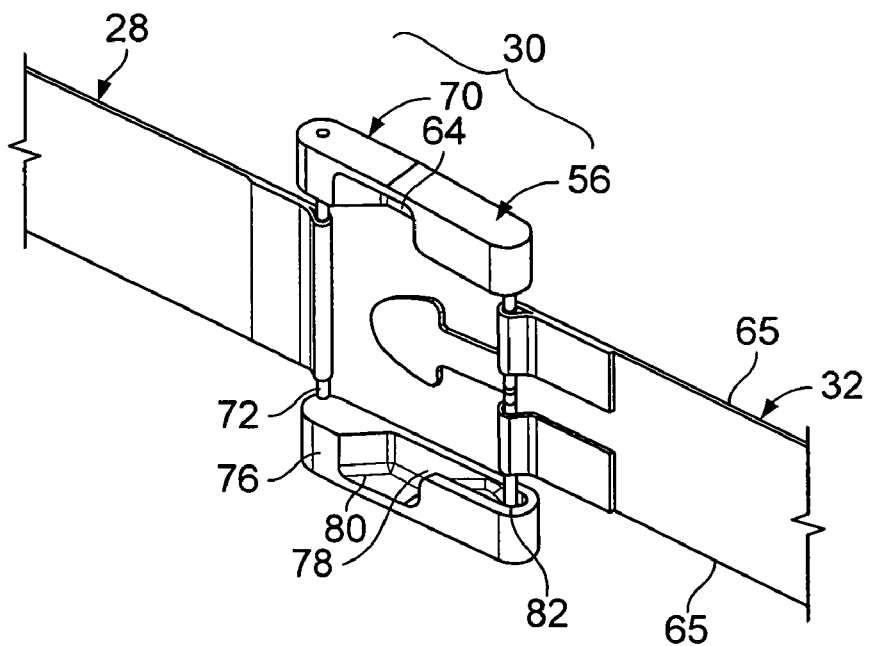

FIGS. 3A-3C are illustrative drawings of a prior art buckle 30 during different stages of coupling. FIGS. 3A, 3B, and 3C show the buckle 30 in an unbuckled state, a partially-buckled state, and a fully-buckled state, respectively. The buckle 30 allows a tape in a tape cartridge (not shown) to be loaded and accessed by a tape drive (not shown). The tape drive includes a second reel that has a drive leader 32, which can be buckled to the tape by a buckler (not shown) as described in U.S. Pat. No. 6,311,915 to Rathweg. The buckler moves the drive leader 32 relative to the cartridge leader 28 to automatically couple (and uncouple) the buckle 30 and thereby attach (and detach) the drive leader 32 to a cartridge leader 28 of the cartridge. The buckle 30 includes a buckle component 56 attached to the cartridge leader 28. The buckle 30 reliably and securely couples the cartridge leader 28 to the drive leader 32.

A buckle bar 58 is secured to the drive leader 32. The buckle bar 58 is a substantially straight piece of rigid material, and has a pair of bar ends 64 which cantilever past opposed edges 65 of the drive leader 32. The buckle component 56 includes a pair of spaced apart buckle clips 70. Each buckle clip 70 is sized and shaped to receive a portion of the buckle bar 58 to couple the drive leader 32 to the cartridge leader 28. The use of two spaced apart buckle clips 70 ensures a reliable connection between the leaders 28, 32. The buckle clips 70 are secured together with a buckle pin 72, which is attached to the cartridge leader 28.

Each buckle clip 70 is sized and shaped to receive one of the bar ends 64. Each of the buckle clips 70 is defined by a substantially rectangular receiver housing 76. Each receiver housing 76 includes a channel 78 having a channel opening 80 and a channel end 82. During coupling, the buckle bar 58 is inserted into the channel opening 80. Subsequently, the buckle bar 58 is forced to slide in the channel 78 until the buckle bar 58 reaches the channel end 82. Preferably, each channel 78 includes a bump 84 that projects into the channel 78 near the channel end 82. The bump 84 reliably holds the buckle bar 58 against the channel end 82. In one aspect, each bump 84 is ramp-shaped to facilitate movement over the bump 84.

Figure 3D:
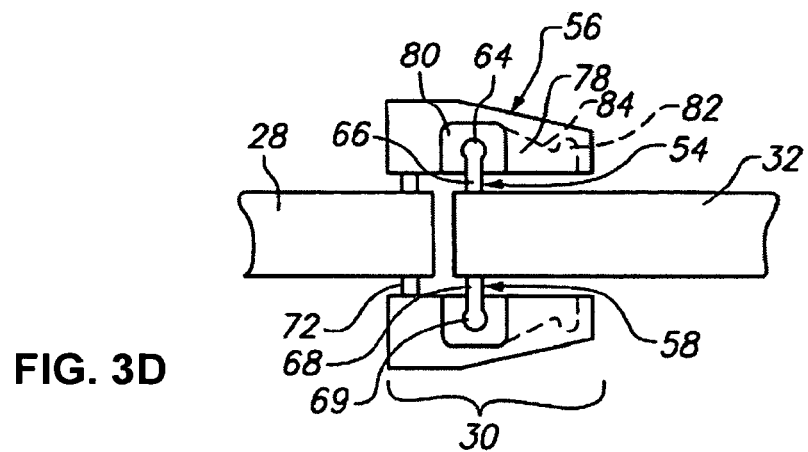
FIGS. 3D-3F are illustrative drawings of elastic flexing of a prior art buckle during different stages of coupling.
Figure 3E:
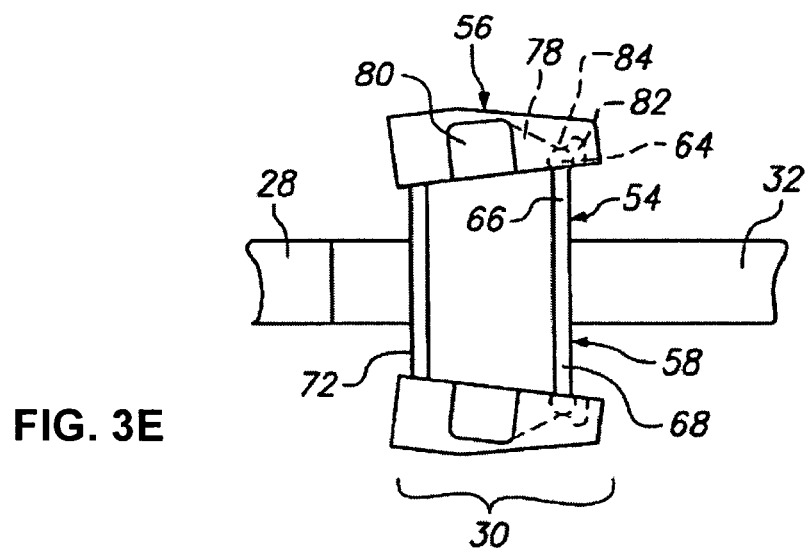
Figure 3F:
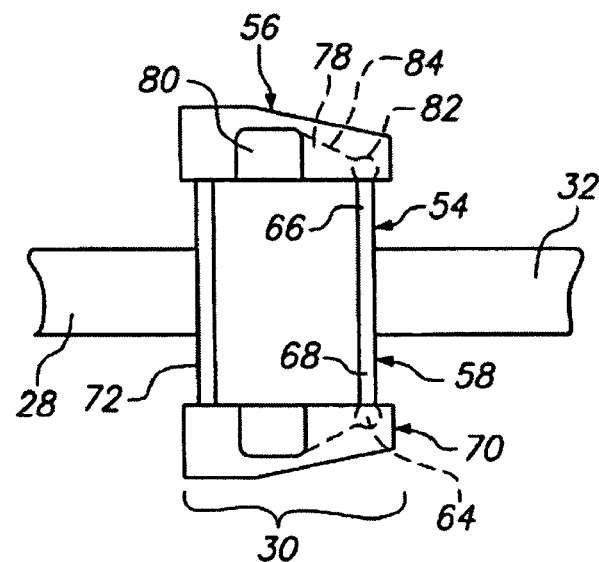

FIGS. 3D-3F are illustrative drawings of elastic flexing of a prior art buckle during different stages of coupling. With reference to FIG. 3D, the buckle components 56 and the buckle pin 72 flex to allow the buckle bar 58 to pass over the bumps 84. The flex illustrated in FIG. 3E is exaggerated to facilitate this discussion. The buckle pin 72 and the buckle components 56 are able to flex and return to their original substantially straight shape. However, in some situations, the buckle pin 72 or the buckle components 56 may flex past their maximum flexing tolerance, and consequently become bent. A bent buckle pin 72 and bent buckle components 56 do not return to their original shape when the force that caused the bending is released. FIG. 3F shows the buckle bar 58 in a final buckled position, in which the buckle clips 70 and the buckle pin 72 have returned to their original shape.

Figure 4A:
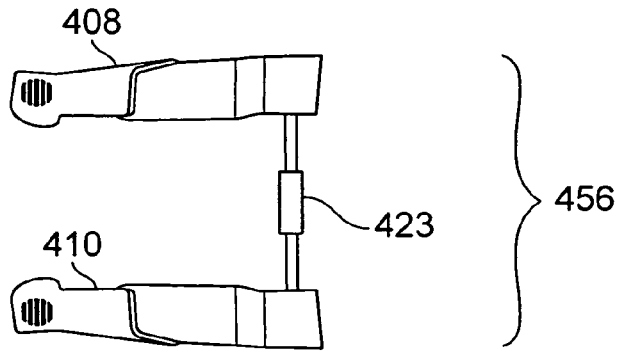
FIG. 4A is an illustrative drawing of a prior art buckle in a magnetic tape cartridge.

FIG. 4A is an illustrative drawing of a prior art buckle 456. The buckle 456 includes a proximal buckle clip 408 joined to a distal buckle clip 410 by a buckle pin 423. The buckle 456 has an original shape, in which the clips 408, 410 and pin 423 are in their designed positions for correct operation of the buckle 456. The buckle 456 typically maintains its original shape or flexes elastically, i.e., temporarily, in normal use. However, in some situations, such as when a cartridge is dropped, one or more components of the buckle 456 may become misaligned. The term "misaligned" is used herein to refer to buckle clips 408, 410 or a buckle pin 423 that is bent, rotated, or otherwise different from its original shape. The buckle clip 408, 410 may become misaligned if they are rotated or flexed sufficiently to exceed their bending tolerance. The bending tolerance of a buckle component depends on the material of which the component is made, and the structure of the component. Since the buckle clips 408, 410 are connected to the buckle pin 423, bending of the pin 423 may result in misaligned buckle clips 408, 410, and vice versa. A misaligned buckle clip 408, 410, or pin 423 may prevent the tape from being correctly loaded by the tape drive, because the buckle 456 may not work properly when one or more of the components of the buckle 456, such as the clips 408, 410 and pin 423, are misaligned.

Figure 4B:
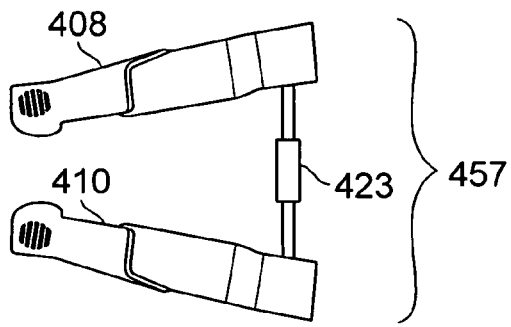
FIGS. 4B-4E are illustrative drawings of bent prior art buckles.
Figure 4C:
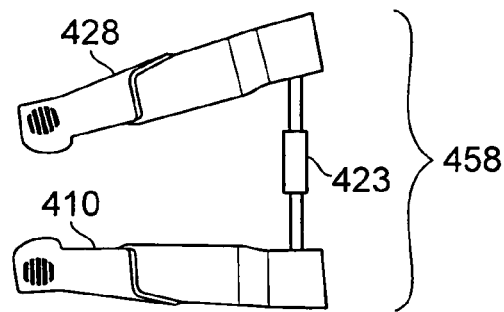
Figure 4D:
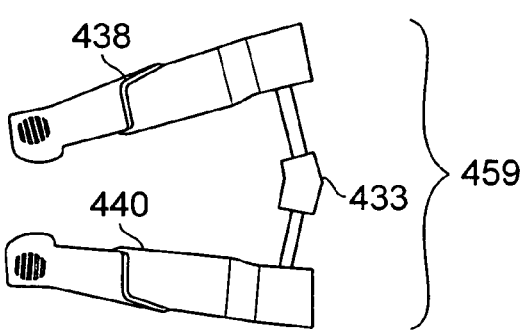
Figure 4E:
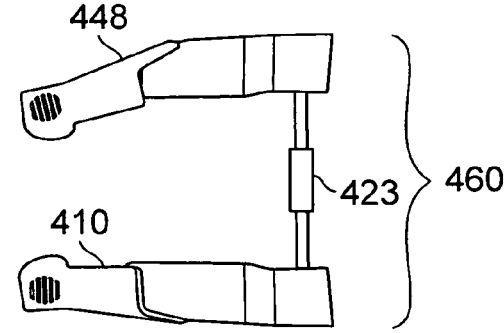

FIGS. 4B-4E are illustrative drawings of misaligned prior art buckles. FIG. 4B shows a buckle 457 in which a proximal buckle clip 408 and a distal buckle clip 410 are both bent inward. FIG. 4C shows a buckle 458 in which a proximal buckle clip 428 is bent, but a distal buckle clip 410 is not bent. FIG. 4D shows a buckle 459 with buckle clips 438, 440, which are misaligned because a buckle pin 433 is bent. FIG. 4E shows a buckle 460 in which the proximal buckle clip 448 is bent near the center of the clip 448.

With respect to FIG. 1, the size, shape, and position of the proximal rib surface 104 and distal rib surface 106 prevent the door 100 from closing if the buckle component 156 is bent, e.g., if one or both buckle clips are misaligned as shown in FIGS. 4B-4E, as can happen if the cartridge 101 is dropped. A force exerted on the cartridge 101 in a direction substantially parallel to a buckle pin 123 has the potential to bend the buckle pin and, as a side effect of bending the buckle pin, rotate the buckle clips. For example, dropping the tape cartridge 101 may compress and bend the buckle pin, which may in turn bend or rotate the buckle clips as shown in FIG. 4D. As previously stated, the buckle pin 72 or the buckle clips 70 may become bent or misaligned, which may lead to various failures with the tape drive, such as a swallowed leader, or the cartridge 101 being physically lodged into a tape drive. Such failures can render both the cartridge 101 and the drive unusable, and may result in costly repairs and loss of data.

FIG. 5 is an illustrative drawing of a tape cartridge 501 with a partially-closed door 500 according to one embodiment of the invention. If a buckle clip (not shown) in the cartridge 501 is bent, the door 500 does not close fully because the bent buckle clip physically blocks the path of the door 500. Without physically opening the tape cartridge door 500 and examining the buckle, a user of the cartridge 501 sees no indication that the cartridge 501 might be damaged. Furthermore, the user might not know how to inspect the cartridge buckle for distortion. Therefore, one or more lateral edges 521 of the door 500 may be of a different color, e.g., painted red, to visually draw the user's attention when the door 500 is not completely closed. The differently-colored edge surface is visible when the door is not 500 closed completely, i.e., is not flush with the corresponding outer surface of the cartridge 501. Therefore the user is likely to notice that the door 500 has failed to close, and may take corrective action. In one aspect, corrective action can include applying a force to the door 500, e.g., by pressing on the door 500, which may cause the reinforcement feature to push the buckle clips, thereby removing the bend and restoring the clips to their original shape. In one aspect, the reinforcement feature is appropriately wedged, i.e., oriented at an angle, to push the clips back to their original shape.

Figure 6:
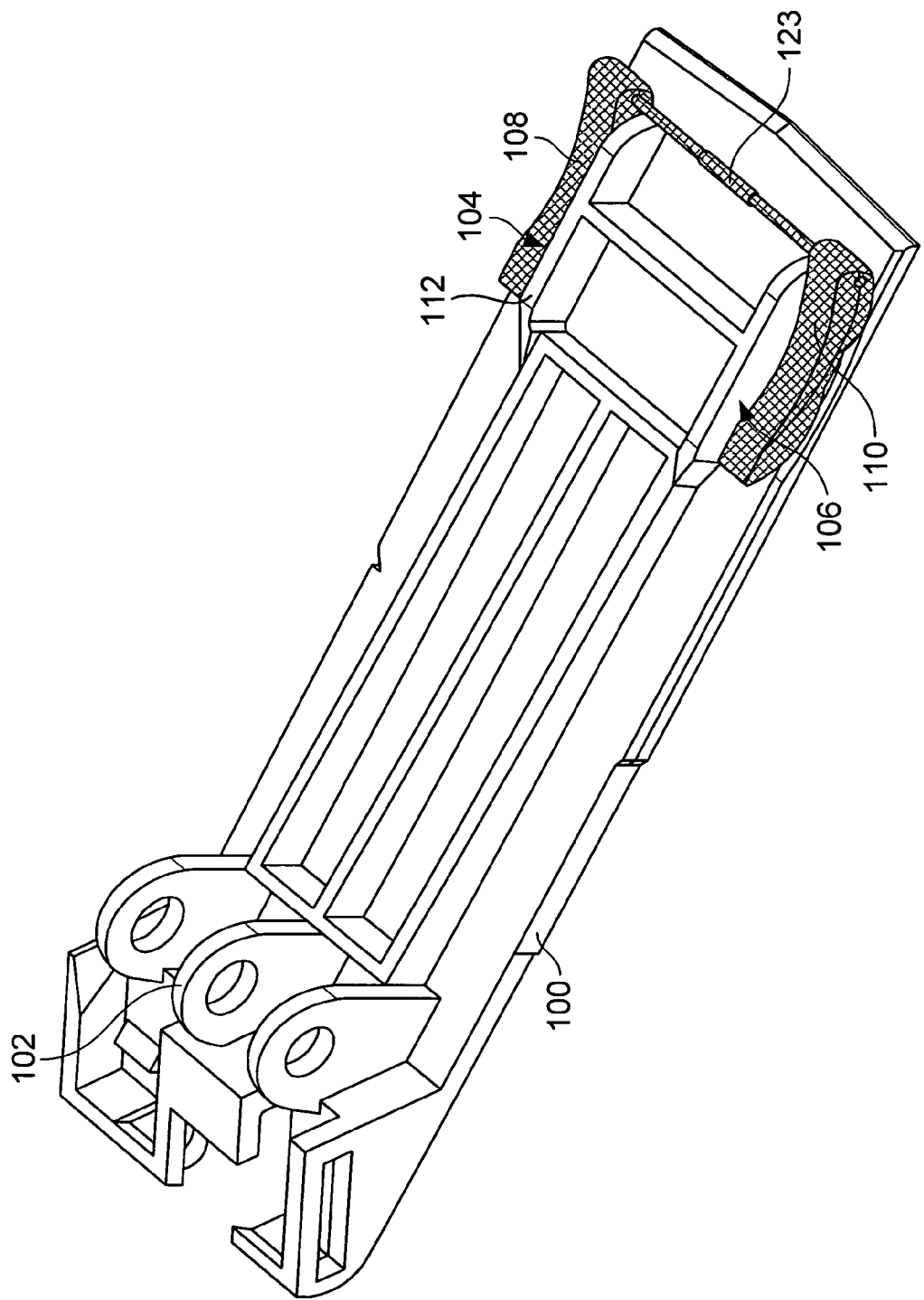
FIG. 6 is an illustrative drawing of a tape cartridge door adjacent to buckle clips according to one embodiment of the invention.

FIG. 6 is an illustrative drawing of a tape cartridge door 100 adjacent to buckle clips 108, 110 according to one embodiment of the invention. A tape cartridge door 100 is shown in a perspective view. The tape cartridge door 100 includes a buckle reinforcement 112, which has a proximal rib surface 104 and a distal rib surface 106. Buckle clips 108, 110 are shown adjacent to and overlaid on the cartridge door 100. The buckle clips 108, 110 are attached to a tape drive, and are positioned adjacent to the cartridge door 100, as shown, when the door is in a closed position. The buckle components include a proximal clip 108 and a distal clip 110, which are joined together by a buckle pin 123.

Figure 7:
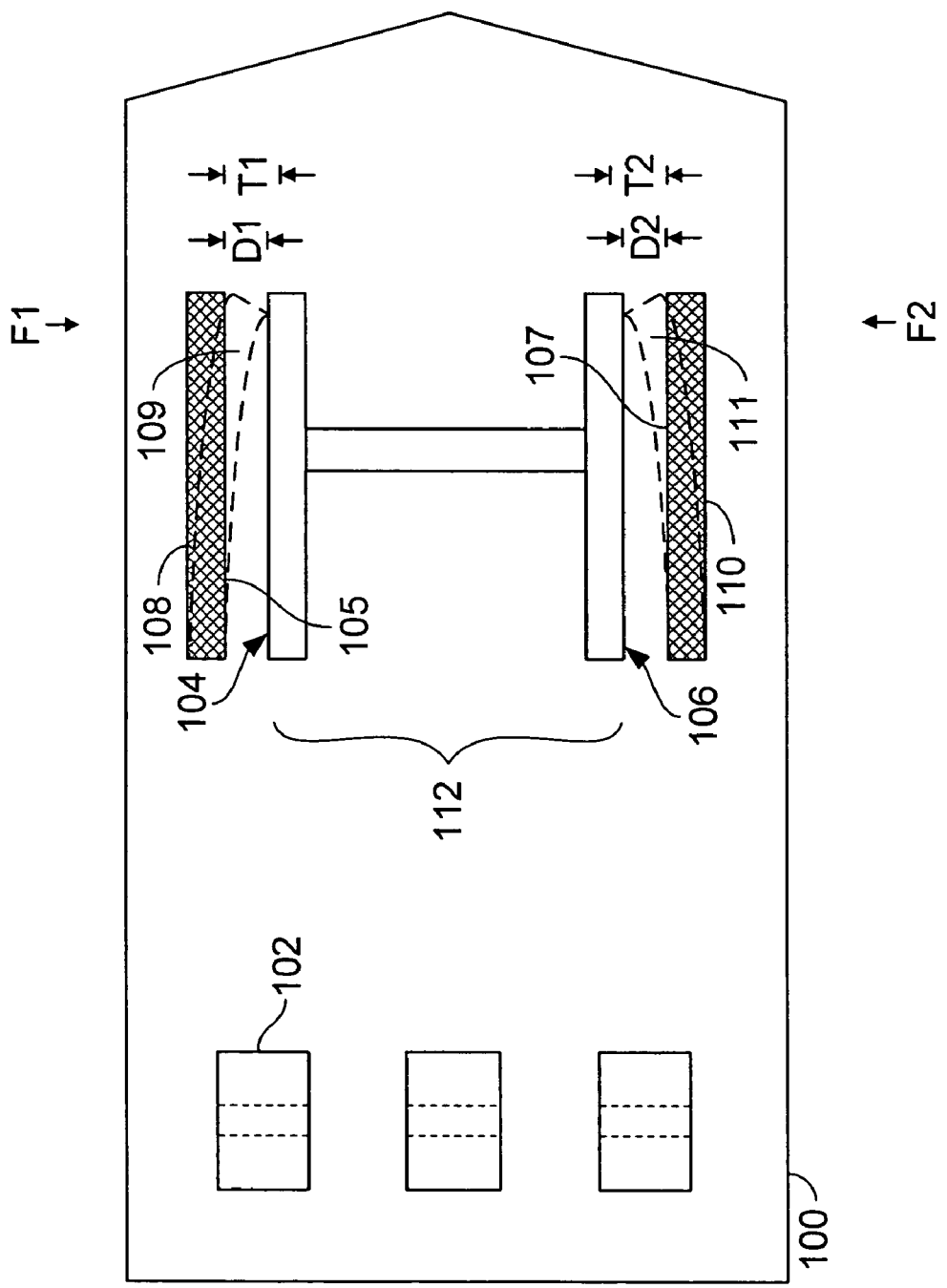
FIG. 7 is an illustrative drawing of a tape cartridge door showing distances to buckle clips according to one embodiment of the invention.

FIG. 7 is an illustrative drawing of a tape cartridge door 100 showing distances to buckle clips 108, 110 according to one embodiment of the invention. A tape cartridge door 100 includes a buckle reinforcement feature 112, which includes a proximal rib surface 104. The proximal rib surface 104 does not move substantially when a force F1 is exerted on the proximal buckle clip 108 and the buckle clip consequently exerts the force F1 on the proximal rib surface 104, because the proximal rib surface 104 is of sufficient strength to retain its shape and position when subjected to the force F1. The proximal rib surface 104 thereby reinforces the proximal buckle clip 108, and prevents the proximal buckle clip 108 from bending beyond a distance D1. The proximal buckle clip 108 and a distal buckle clip 110 are attached to a tape drive, as shown in FIG. 1. The distal rib surface 106 similarly reinforces the distal buckle clip 110 against a force F2. In FIG. 7, the buckle clips 108, 110 are shown overlaid on the cartridge door 100. The buckle clips 108, 110 are overlaid on the cartridge door 100, as shown, when the door is in a closed position, such as the closed position shown in FIG. 2. Note that although the forces F1 and F2 are directed perpendicularly to the rib surfaces 104, 106 in FIG. 7, the forces may be exerted in other directions.

The buckle reinforcement 112 is of sufficient strength to absorb the force F1 without substantially bending, deforming, or otherwise moving. Therefore the buckle reinforcement 112 prevents the buckle clip 108 from becoming misaligned or inoperative as a result of a force F1 if the distance D1 between a proximal clip inner surface 105 of the buckle clip 108 and a proximal rib surface 104 of the buckle reinforcement 112 is less than the maximum bending tolerance T1. The tolerance T1 is a maximum flexing or bending distance, beyond which the proximal buckle clip 108 may become misaligned and therefore inoperative. The distances D1 and T1 are measured along an axis A1 perpendicular to the proximal buckle clip 108. The buckle clip will contact the proximal rib surface 104 after moving by a distance D1, where D1 is less than T1 to prevent the buckle clip from flexing or bending beyond the tolerance T1. Flexing of the buckle clips is shown with dashed lines. In one aspect, a proximal flexed buckle clip outline 109 shows the flexing of the proximal buckle clip 108 to the distance D1. When the proximal buckle clip 108 is flexed to the distance D1, the flexing is stopped by contact with the proximal rib surface 104 of the buckle reinforcement 112, so that the proximal buckle clip 108 does not flex to a distance greater than D1. Note that the degree of flexing and the distances, such as the distance D1, are shown in exaggerated proportions for descriptive clarity.

In one aspect, the force F1 an external force is directed toward the proximal buckle clip 104 of FIG. 1 at a nonzero angle to the clip 104. The force F2 is similarly an external force directed toward the distal buckle clip 110 at a nonzero angle to the clip 110. The forces F1 and F2 may be caused by, for example, an impact against a top surface of the tape cartridge as a result of dropping the cartridge or placing excessive weight on top of the cartridge.

Multiple buckle clips and corresponding buckle reinforcements may be present on the cartridge door 100. For example, a distal buckle clip 110 is shown in FIG. 7 in addition to the proximal buckle clip 108. The distal buckle clip 110 is stopped from flexing beyond a distance D2 by a distal rib surface 106 of the buckle reinforcement 112. The distance D2 is the distance between the distal rib surface 106 and a distal clip inner surface 107. Flexing of the distal buckle clip 110 is shown as a distal flexed buckle clip outline 111. The maximum bending distance of the distal buckle clip 110 is shown as a maximum bending tolerance T2, and the distance D2 is less than the tolerance T2.

Furthermore, although the buckle clip 108 and the edges of the buckle reinforcement 112, including the proximal clip inner surface 105 and the proximal rib surface 104, are shown as straight lines, any or all of these features may include angled or curved surfaces, in which case the distances D1 and T1 are measured from particular points on the surfaces. For example, distance D1 would be the shortest distance between a point on the proximal clip inner surface 105 and the proximal rib surface 104, and the bending tolerance T1 would be measured from a specific point on the proximal buckle clip 108. In one aspect, the proximal rib surface 104 is positioned so that the distance D1 is less than a predefined distance, e.g., less than 0.1 inches. In one aspect, the distance D1 is between 0 and 0.05 inches, which includes between 0 and 0.037 inches for the door 100, and between 0 and 0.01 inches of tolerance for the proximal buckle clip 108. In another aspect, the distance D1 may be between 0 and 0.1 inches. In yet another aspect, the distance D1 may be between 0 and 0.3 inches. The tolerance T1 may be, for example, 0.09 inches. In one aspect, T1 may be between 0.04 and 0.14 inches.

Although the buckle reinforcement 112 shown in FIG. 7 has two horizontal ribs and a vertical rib, other shapes, such as a single block, or two horizontal ribs without a vertical rib, and other sizes, are possible and contemplated.

Figure 8:
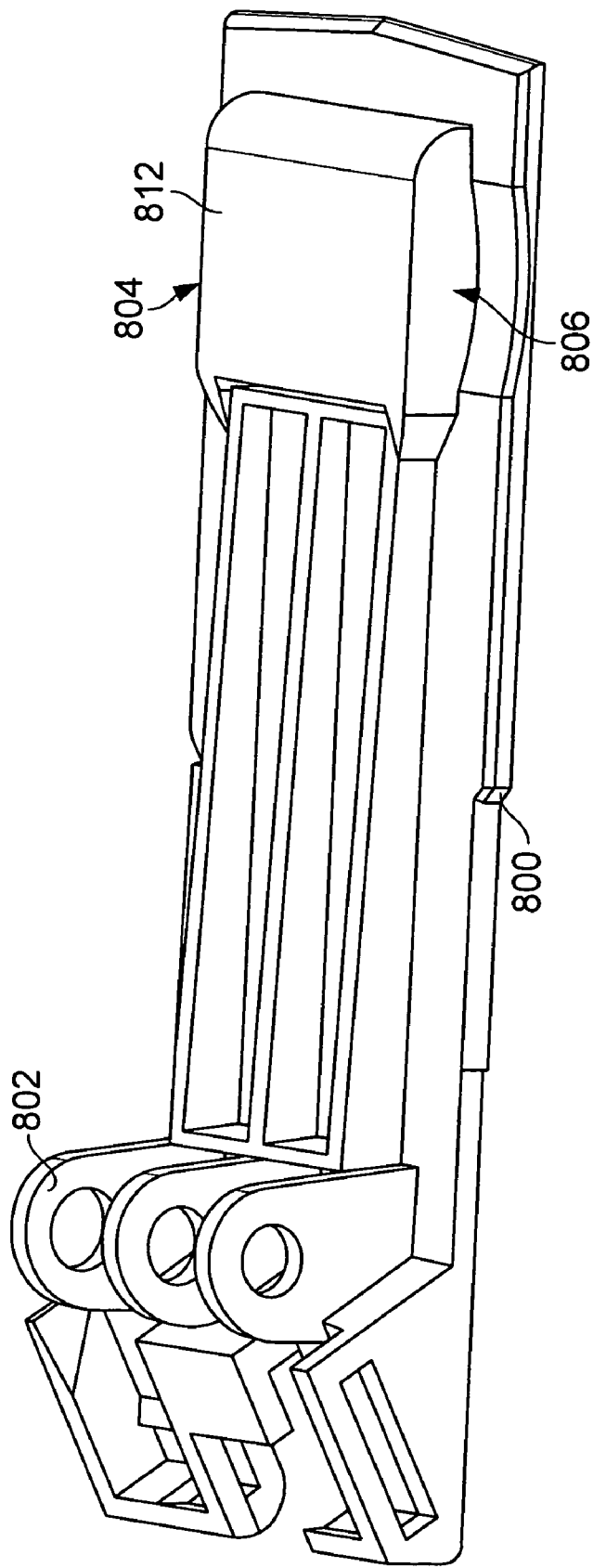
FIG. 8 is an illustrative drawing of a tape cartridge door with a buckle reinforcement feature according to one embodiment of the invention.

FIG. 8 is an illustrative drawing of a tape cartridge door 800 which includes a buckle reinforcement feature 812 according to one embodiment of the invention. The buckle reinforcement feature 812 is a single raised feature with a proximal surface 804 and a distal surface 806 in locations similar to those of the proximal rib surface 104 and the distal rib surface 106, respectively, of FIG. 7. The feature 812 may be integrally formed on the door 800, e.g., molded as part of the door, or may be a protrusion secured to the door, e.g., a separate part glued or otherwise affixed to the door. The feature 812 resists forces on both the proximal surface 804 and on the distal surface 806.

Figure 9:
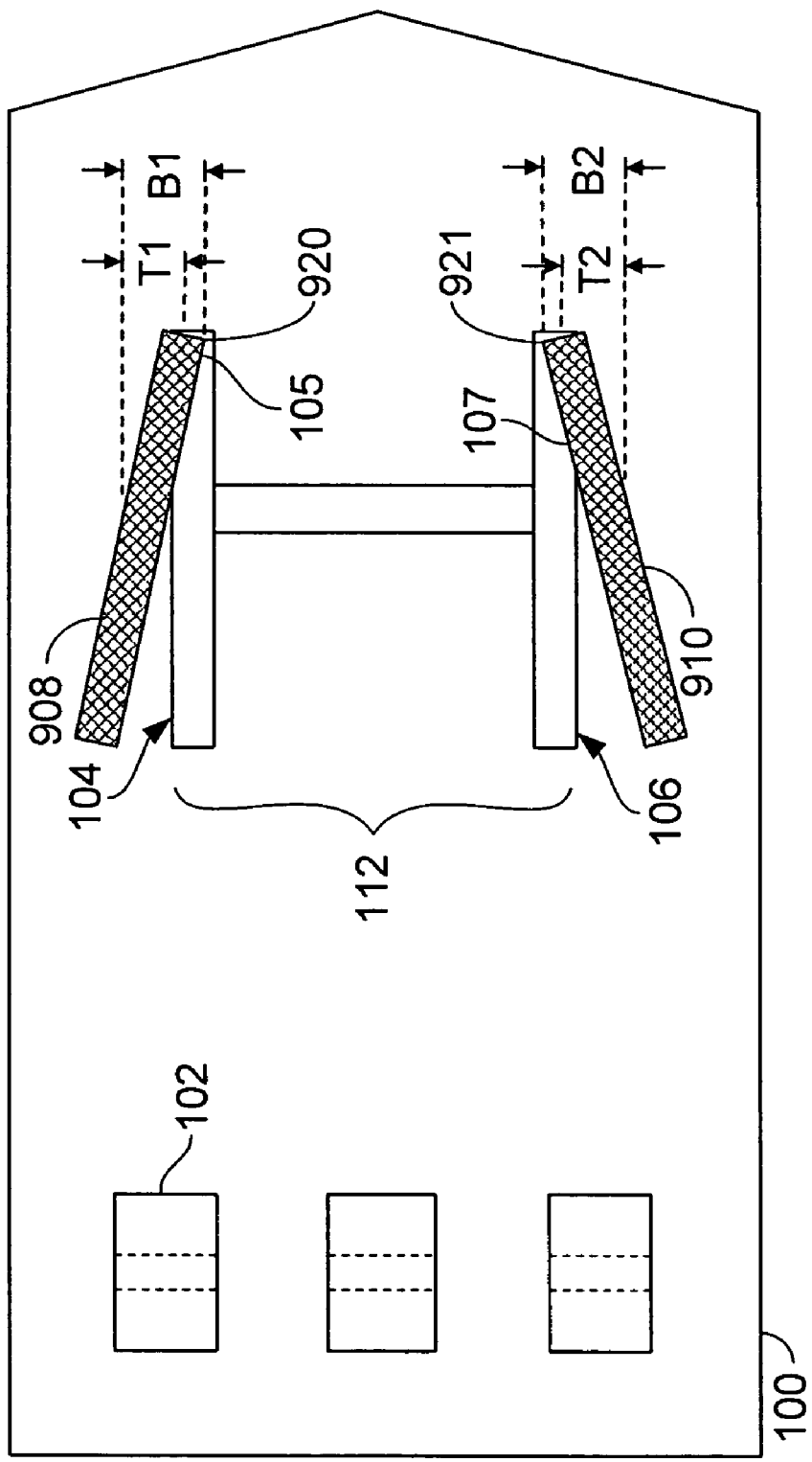
FIG. 9 is an illustrative drawing of a tape cartridge door showing a buckle reinforcement overlapping misaligned buckle clips according to one embodiment of the invention.

FIG. 9 is an illustrative drawing of a tape cartridge door 100 showing a buckle reinforcement 112 overlapping misaligned buckle clips 908, 910 on an open or partially-open door 100 according to one embodiment of the invention. The proximal buckle clip 908 and a distal buckle clip 910 are both misaligned, e.g., as the result of a force on a tape cartridge associated with the door 100. The misaligned proximal clip 908 and distal clip 910 will physically contact the proximal rob 104 and the distal rib 106, respectively, when the door is moved from an open position to a closed position, thereby blocking the door from being closed completely.

More precisely, the proximal buckle clip 908 is misaligned if a distance B1 is greater than the bending tolerance T1. The distal buckle clip 910 is misaligned if a distance B2 is greater than the bending tolerance T2. The distance B1 is the vertical distance that a lowermost point 920 of the proximal buckle clip 908 has moved, measured from the original position of the lowermost point 920 prior to bending. The distance B2 is the vertical distance that an uppermost point 921 of the distal buckle clip 910 has moved, measured from the original position of the uppermost point 921 prior to bending. The distances B1 and T1 are measured along an axis perpendicular to the original (correctly aligned) orientation of the buckle clips 908, 910. Therefore, since B1 is greater than T1, the buckle clip 908 is characterized as misaligned. As shown in FIG. 7, when a buckle clip 908, 910 is misaligned, the buckle clip 908, 910 overlaps, the buckle reinforcement 112, which will result in the buckle reinforcement 112 contacting the buckle clip 908, 910 when the door is moved from the open position to the closed position. Such contact obstructs the path of the door and thereby prevents the door from closing normally.

Figure 10:
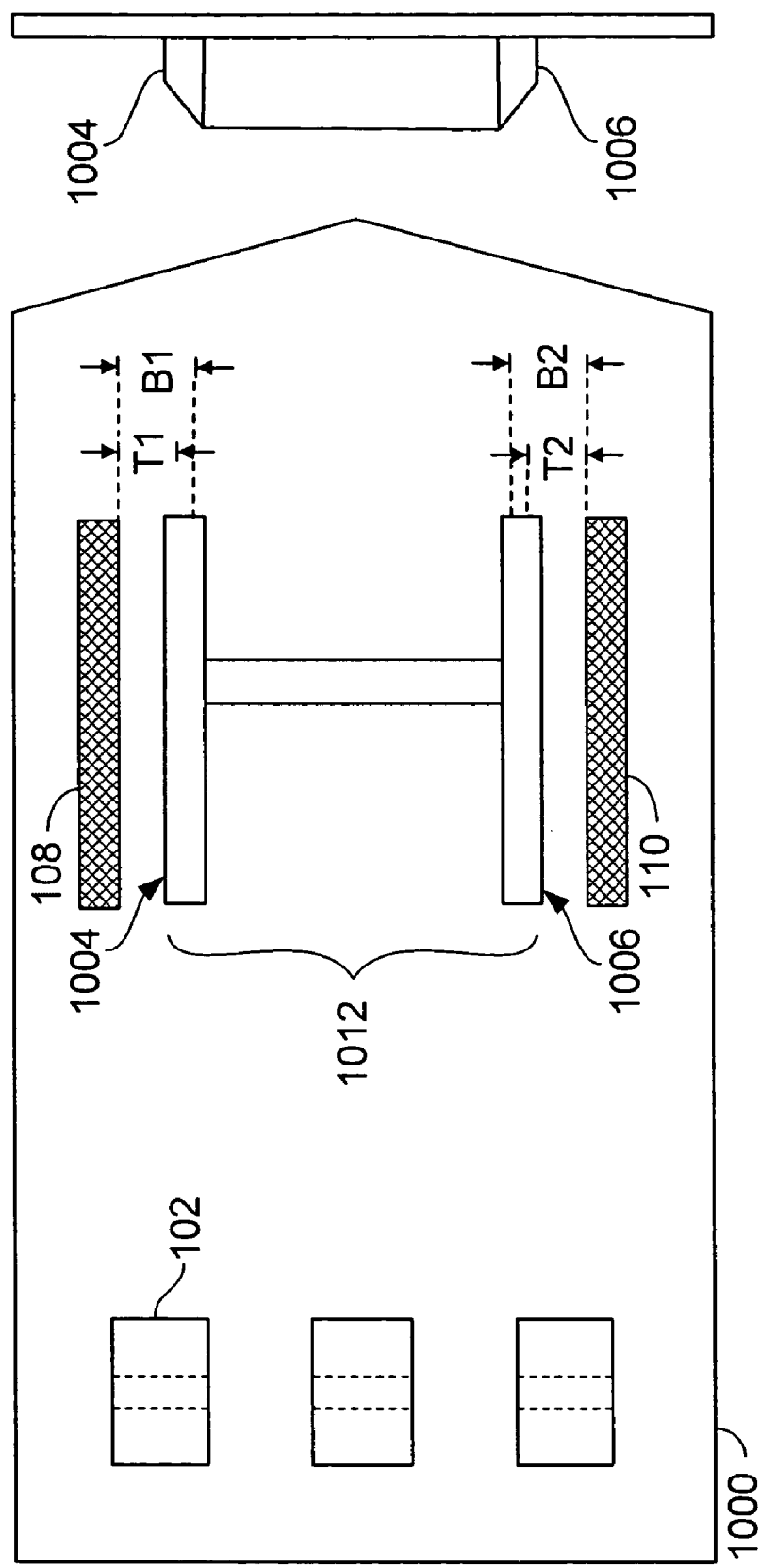
FIG. 10 is an illustrative drawing of a tape cartridge door showing a wedge-shaped buckle reinforcement for straightening bent buckle clips according to one embodiment of the invention.

FIG. 10 is an illustrative drawing of a tape cartridge door showing wedge-shaped buckle reinforcements 1004, 1006 for straightening bent buckle clips according to one embodiment of the invention. A door 1000 includes wedged buckle reinforcements 1004, 1006, which are shaped as wedges to straighten the buckle clips 108, 110 when the door 1000 is moved from an open or partially open position to a closed position. If the proximal buckle clip 108 is bent or deformed downward, and the door 1000 is moved from the open position to the closed position with sufficient force, the proximal wedged buckle reinforcement 1004 will push against and straighten the proximal buckle clip 108. Similarly, if the distal buckle clip 110 is bent or deformed upward, and the door 1000 is moved from the open position to the closed position with sufficient force, the distal wedged buckle reinforcement 1006 will push against and realign or straighten the distal buckle clip 110. The wedge shapes of the buckle clips 1004, 1006 are shown in the right side view of FIG. 10. The wedges 1004, 1006 are shown as straight diagonal wedges, but the wedges may be any surface which is appropriately angled, shaped, or curved to push the buckle clips 108, 110 back their original, i.e., correctly aligned, position when the door is moved toward the closed position, if the buckle clips 108, 110 are misaligned.

Figure 11:
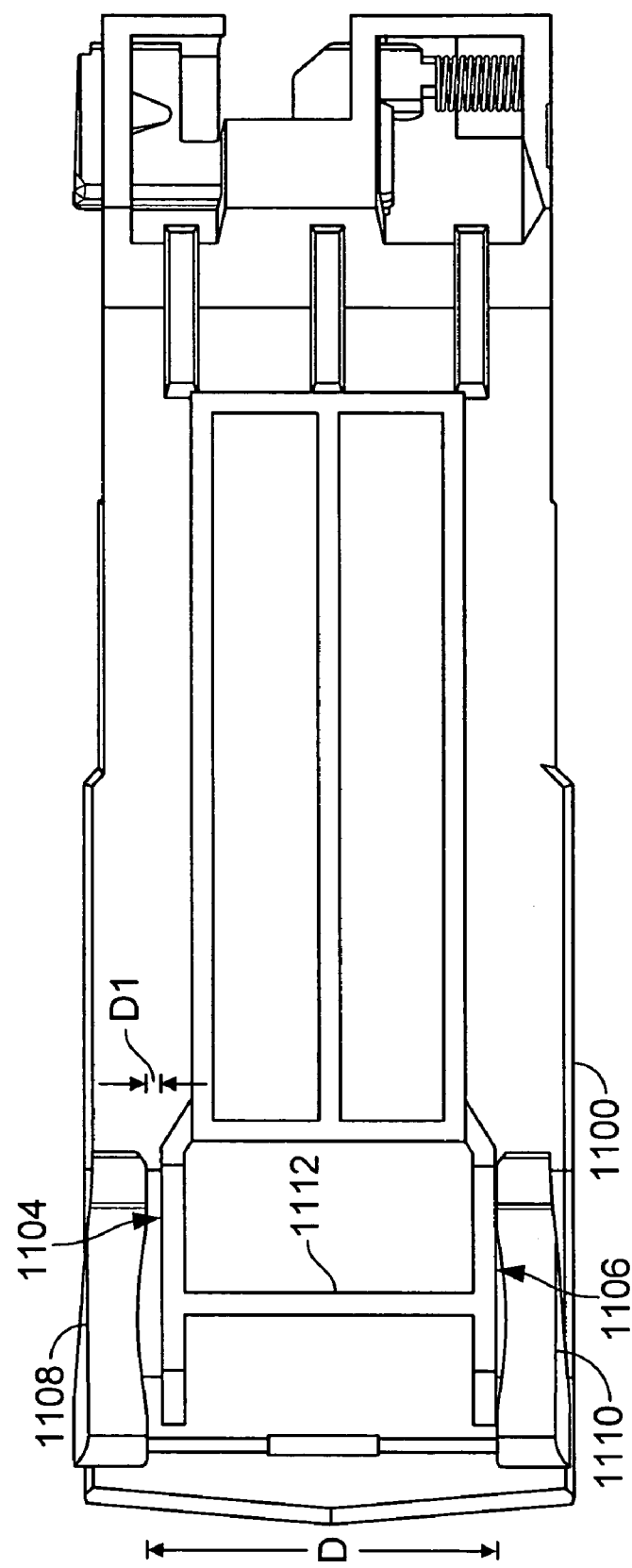
FIG. 11 is an illustrative drawing of a tape cartridge door showing dimensions of a buckle reinforcement according to one embodiment of the invention.

FIG. 11 is an illustrative drawing of a tape cartridge door 1110 showing dimensions of a buckle reinforcement 1112 according to one embodiment of the invention. The tape cartridge door 1100 has a proximal buckle clip 1108 and a distal buckle clip 1110. A distance D between the proximal buckle clip 1108 and the distal buckle clip 1110 is, for example, 0.636 inches, with a tolerance of 0.01 inches to allow for motion of the clips. As another example, the distance D may be 0.5 inches. The proximal buckle clip 1108 is separated from a proximal rib surface 1104 by a distance D1 of up to 0.027 inches, with a tolerance of 0.01 inches for motion of the clips, and an additional tolerance of 0.01 inches for motion of the proximal rib surface 1104 (e.g., because of slight distortion of the door 1110).

The maximum buckle bending tolerance T1 is determined as follows. In one instance, when one or both of the buckle clips 1108, 1110 are bent inward, the distance D1 between the inside surface of the clip 1108 and the proximal rib surface 1104 decreases. The distance D1 can decrease to a minimum distance D1' of 0.56 inches before the buckle clips become misaligned and the buckling mechanism ceases to engage the buckle clips properly. Therefore, the tolerance T1 is D1−D1'=0.646−0.56=0.086 inches in this example. Using a tolerance of 0.01 inches, T1 is in the range of 0.085 to 0.087 inches in this example. The distance D1 should be less than the bending tolerance T1. Therefore, in this example, the distance between the proximal buckle clip 1108 and the proximal rib surface 1104 should be less than 0.086+/−0.01 inches. Since D1 is 0.047+/−0.01 inches in this example, which is less than 0.086 inches, the buckle reinforcement 1112 is correctly sized and shaped to reinforce the buckle clips 1108, 1110 by preventing the clips from being bent beyond their maximum bending tolerance. If the reinforcements 1104, 1106 are wedged, then the reinforcements can straighten the buckle clips 1108, 1108 if the buckle clips are bent beyond their maximum bending tolerance. When a door with such wedged reinforcements is closed, the reinforcements 1104, 1106 will push the bent clips 1108, 1110, thereby increasing the distance D1 to be greater than the bending tolerance T1, so that the buckle mechanism will properly engage the buckle clips.

The buckle reinforcement feature added to the cartridge door provides enhanced support for the buckle clips and thereby improves the ability of the buckle clips and buckle pin to withstand external forces and impacts without deformation. The feature or rib of the cartridge door is of sufficient size, shape, strength, and orientation so that, when the cartridge door is in a closed position, the feature or rib provides reinforcing support to the buckle clips.

If a buckle does become misaligned, the buckle reinforcement provides visual and tactile indications of the misalignment to the user. If a buckle clip is bent or moved from its proper alignment, orientation, or position, then the buckle reinforcement will come into contact with the misaligned buckle clip when an attempt is made to close the door, thereby resisting the proper closing of the door. A user who is attempting to close the door will notice the resistance and can therefore recognize that the tape cartridge, and particularly the buckle clips or buckle pin, may be damaged. In one aspect, the person can then attempt to apply additional pressure to the door, and if the feature is of a wedged shape, i.e., has an angled surface adjacent to the buckle clips, the additional pressure on the door may bend or move the buckle clips back to their proper alignment, orientation, or position. In another instance, the user may manually attempt to correct the buckle clips after the deformity is brought to their attention by the resistance of the door to being closed.

This disclosure is illustrative and not limiting; further modifications will be apparent to those skilled in the art in light of this disclosure and are intended to fall within the scope of the appended claims.

What is claimed is:

1. A storage medium cartridge door for use with a cartridge, the cartridge being associated with a buckle having two laterally spaced apart buckle clips, the cartridge door comprising:
a feature operable to be positioned between the buckle clips when the door is in a closed position, wherein the feature is further operable to support the clips.

2. The cartridge door of claim 1, wherein the feature is further operable to support a substantial portion of the surface area of a surface of each buckle clip.

3. The cartridge door of claim 1, wherein the feature is separated from each buckle clip by less than a predefined distance when the door is in a closed position.

4. The cartridge door of claim 3, wherein the predefined distance is 0.3 inches.

5. The cartridge door of claim 3, wherein the predefined distance is 0.1 inches.

6. The cartridge door of claim 3, wherein the predefined distance is 0.05 inches.

7. The cartridge door of claim 3, wherein the predefined distance is a bending tolerance associated with each buckle clip.

8. The cartridge door of claim 7, wherein the bending tolerance is 0.087 inches.

9. The cartridge door of claim 1, wherein the feature includes a first rib having a first rib surface operable to be positioned adjacent to a first buckle clip, and a second rib having a second rib surface operable to be positioned adjacent to a second buckle clip when the door is in a closed position.

10. The cartridge door of claim 9, wherein the first rib is separated from the first buckle clip by less than a first predetermined distance, and the second rib is separated from the second buckle clip by less than a second predetermined distance, when the door is in a closed position.

11. The cartridge door of claim 10, wherein the first and second predetermined distances are each 0.3 inches.

12. The cartridge door of claim 10, wherein the first and second predetermined distances are each 0.1 inches.

13. The cartridge door of claim 10, wherein the first and second predetermined distances are each 0.05 inches.

14. The cartridge door of claim 1, wherein the feature includes a first rib operable to support a first buckle clip, and a second rib operable to support a second buckle clip when the door is in a closed position.

15. The cartridge door of claim 14, wherein the first rib is operable to support at least a center portion of the first buckle clip, and the second rib is operable to support at least a center portion of the second buckle clip when the door is in a closed position.

16. The cartridge door of claim 1, wherein the door is pivotally connected to the cartridge.

17. The cartridge door of claim 1, wherein the feature is integrally formed on the door.

18. The cartridge door of claim 1, wherein the feature includes a protrusion rigidly secured to the door.

19. The cartridge door of claim 1, wherein the clips are separated by less than a predetermined distance.

20. The cartridge door of claim 19, wherein the predetermined distance is 0.5 inches.

21. The cartridge door of claim 1, wherein the feature is operable to be positioned within less than a predetermined distance of the buckle clips when the door is in a closed position.

22. The cartridge door of claim 21, wherein the predetermined distance is 0.3 inches.

23. The cartridge door of claim 21, wherein the predetermined distance is 0.1 inches.

24. The cartridge door of claim 21, wherein the predetermined distance is 0.05 inches.

25. The cartridge door of claim 1, wherein a first surface of the feature is operable to be separated from a first buckle clip by a first predetermined distance, and a second surface of the feature is operable to be separated from a second buckle clip by a second predetermined distance when the door is in a closed position.

26. The cartridge door of claim 25, wherein the first predetermined distance is 0.3 inches and the second predetermined distance is 0.3 inches.

27. The cartridge door of claim 25, wherein the first predetermined distance is 0.1 inches and the second predetermined distance is 0.1 inches.

28. The cartridge door of claim 25, wherein the first predetermined distance is 0.05 inches and the second predetermined distance is 0.05 inches.

29. A storage medium cartridge door for use with a cartridge, the cartridge being associated with a buckle having two laterally spaced apart buckle clips, the cartridge door comprising:
a feature operable to be positioned between the buckle clips when the door is in a closed position, wherein the feature is positioned on the cartridge door to contact at least a portion of a misaligned buckle clip when the door is moved from an open position toward the closed position if at least one of the buckle clips is misaligned.

30. A storage medium cartridge door for use with a cartridge, the cartridge being associated with a buckle having two laterally spaced apart buckle clips, the cartridge door comprising:

a feature operable to be positioned between the buckle clips when the door is in a closed position, wherein the feature is positioned on the cartridge to block the door from being closed if at least one of the buckle clips is misaligned, and further positioned to allow the door to be closed if the buckle clips are properly aligned.

31. A storage medium cartridge door for use with a cartridge, the cartridge being associated with a buckle having two laterally spaced apart buckle clips, the cartridge door comprising:

a feature operable to be positioned between the buckle clips when the door is in a closed position, wherein the feature includes at least one wedged surface positioned to realign a misaligned buckle clip when the door is moved from an open position toward a closed position.

32. A tape cartridge comprising:

a buckle for buckling a tape;

a cartridge door including a feature operable to support the buckle when the door is closed, wherein the buckle comprises two laterally spaced apart buckle clips, and the feature is operable to be adjacent to the buckle clips when the door is in a closed position, and the feature is operable to support the two buckle clips when the door is in a closed position.

* * * * *